US012739628B2

(12) United States Patent
Li et al.

(10) Patent No.: US 12,739,628 B2
(45) Date of Patent: Sep. 15, 2026

(54) METHOD FOR SLICE-SPECIFIC AUTHENTICATION AND AUTHORIZATION STATUS TRANSMISSION

(71) Applicant: ZTE Corporation, Shenzhen (CN)

(72) Inventors: Zhijun Li, Shenzhen (CN); Jinguo Zhu, Shenzhen (CN); Shuang Liang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 178 days.

(21) Appl. No.: 18/159,856

(22) Filed: Jan. 26, 2023

(65) Prior Publication Data

US 2023/0379704 A1 Nov. 23, 2023

Related U.S. Application Data

(63) Continuation of application No. PCT/CN2020/106260, filed on Jul. 31, 2020.

(51) Int. Cl.
*H04W 12/06* (2021.01)
*H04W 12/08* (2021.01)
*H04W 48/18* (2009.01)

(52) U.S. Cl.
CPC ........... *H04W 12/06* (2013.01); *H04W 12/08* (2013.01)

(58) Field of Classification Search
CPC .............................. H04W 12/06; H04W 12/08
USPC .............................................................. 726/4
See application file for complete search history.

(56) References Cited

U.S. PATENT DOCUMENTS

2018/0027414 A1* 1/2018 Li ......................... H04W 12/06 455/435.1
2019/0132218 A1* 5/2019 Senarath ................. H04L 41/18
2020/0162919 A1* 5/2020 Velev ..................... H04W 60/00
2021/0337383 A1* 10/2021 Faccin ................... H04W 12/72
2023/0189121 A1* 6/2023 Hedman ............... H04W 4/021 370/329
2023/0232356 A1* 7/2023 Johansson ............ H04W 12/06 455/411
2024/0236910 A1* 7/2024 Tiwari .................. H04W 48/14
2024/0305956 A1* 9/2024 Gan ........................ H04W 4/06
2024/0306246 A1* 9/2024 Zhang ................... H04W 52/02

FOREIGN PATENT DOCUMENTS

CN 110476447 A 11/2019
CN 111183614 A 5/2020
CN 115348192 * 11/2022

(Continued)

OTHER PUBLICATIONS

Chun-I Fan; Cross-Network-Slice Authentication Scheme for the 5th Generation Mobile Communication System; IEEE; Year:2021; pp. 701-712.*

(Continued)

*Primary Examiner* — Monjur Rahim
(74) *Attorney, Agent, or Firm* — Crowell & Moring LLP

(57) ABSTRACT

A wireless communication method for use in network slice-specific authentication and authorization function is disclosed. The wireless communication method comprises storing a network slice-specific authentication and authorization, NSSAA, status comprising a plurality of records for a wireless terminal, and transmitting, to an access and mobility management function, AMF, the NSSAA status.

17 Claims, 7 Drawing Sheets

(56) References Cited

FOREIGN PATENT DOCUMENTS

| | | |
|---|---|---|
| KR | 10-2019-0088878 | 7/2019 |
| WO | WO 2020/099931 A1 | 5/2020 |

OTHER PUBLICATIONS

International Search Report and Written Opinion for priority application No. PCT/CN2020/106260 dated Apr. 25, 2021, 7p.
Chairman et al., "Proposed allocation of documents to agenda items for CT4#97E: Status at eve of meeting", 3GPP TSG-CT WG4 Meeting #97E, C4-202004, Apr. 23, 2020, 54p.
3GPP, "Technical Specification Group Core Network and Terminals", 5G System, Network Slice-Specific Authentification and Authorization (NSSAA) services, Stage 3, Release 16, 3GPP TS 29.526 V1.0.0, Section 5.2.2, Jun. 2020, 30p, FR.
Extended European Search Report for corresponding application No. EP20947798.3 dated Mar. 6, 2024, 11p.
ZTE et al., "Replacing AUSF by NSSAAF to support NSSAA", 3GPP TSG-WG SA2 Meeting #139e, S2-2003744, Jun. 5, 2020, 7p.
Office Action issued for China Patent Application No. 2020801047403 dated Jun. 28, 2024 (18 pp.).

* cited by examiner

METHOD FOR SLICE-SPECIFIC AUTHENTICATION AND AUTHORIZATION STATUS TRANSMISSION

RELATED APPLICATIONS

This application is a continuation application of International Application No. PCT/CN2020/106260, filed on Jul. 31, 2020, which is incorporated by reference in its entirety.

BACKGROUND

This document is directed generally to wireless communications.

In 5G communication systems, a network slice is introduced to serve particular customers by providing specific services. The network slice is identified by single network slice selection assistance information (S-NSSAI). Based on the S-NSSAI, the network can find an appropriate network slice which satisfies service requirements.

For example, a network operator may provide a particular network slice for machine type communication (MTC) devices. Accordingly, the S-NSSAI with a specific value is defined to identify this particular network slice.

In addition, a user equipment (UE) may be configured to be allowed to access a list of network slices. Before the UE requests to use services and resources provided by a specific network slice, the UE shall first be verified that the UE has a permission to access this specific slice. Such permission verification is called as network slice-specific authentication and authorization (NSSAA) procedure. The NSSAA procedure is in addition to a primary authentication to the UE itself. After the NSSAA procedure, the network (e.g. an access and mobility management function (AMF)) stores an NSSAA authentication status of each S-NSSAI for the given UE, so as to not perform the NSSAA procedure again every time a registration associated with the UE being updated.

However, the UE may have high mobility behavior between 5G network and 4G networks. When the UE leaves a 5G network, it normally results in deregistration to that UE and the stored NSSAA authentication status is thus removed from the AMF. When the UE moves back to the 5G network, the NSSAA procedure needs to be invoked again. If the UE moves between a 5G network and a 4G network frequently, a lot of signaling and time would be wasted on triggering the NSSAA procedure again and again. Such behavior typically increases signally consumption and introduces more delay for an inter-system mobility procedure. Furthermore, it degrades the customer experience.

This document relates to methods, systems, and devices for slice-specific authentication and authorization status transmission.

The present disclosure relates to a wireless communication method for use in network slice-specific authentication and authorization function, the wireless communication method comprising:

storing a network slice-specific authentication and authorization, NSSAA, status comprising a plurality of records for a wireless terminal, and transmitting, to an access and mobility management function, AMF, the NSSAA status.

Various embodiments may preferably implement the following features:

Preferably, one of the plurality of records comprises at least one of single network slice selection assistance information, S-NSSAI, or an authentication status of the S-NSSAI.

Preferably, the wireless communication method further comprises receiving, from the AMF, an indication of storing the NSSAA status.

Preferably, the wireless communication method further comprises receiving, from the AMF, a request for retrieving the NSSAA status.

Preferably, the wireless communication method further comprises subscribing, to a unified data management, UDM, a registration event associated with the wireless terminal, and receiving, from the UDM, a registration event notification corresponding to the registration event associated with the wireless terminal.

Preferably, the registration event is associated with at least one of a registration or a deregistration of an AMF for the wireless terminal.

Preferably, the registration event notification comprises at least one of an instance identification of the AMF, an action type indicating one of a registration or a deregistration, a uniform resource identifier for transmitting the NSSAA status or an identifier of the wireless terminal.

Preferably, the wireless communication method further comprises transmitting, to a network repository function, a request for a unified resource identifier of the AMF for transmitting the NSSAA status.

Preferably, the NSSAA status further comprises an identifier of the wireless terminal.

Preferably, the wireless communication method further comprises updating the NSSAA status according to a result of an NSSAA procedure.

The present disclosure relates to a wireless communication method for use in an access and mobility management function. The wireless communication method comprises:

receiving, from a wireless terminal, a registration request comprising a list of requested single network slice selection assistance information, S-NSSAI, and receiving, from a network slice-specific authentication and authorization function, NSSAAF, a network slice-specific authentication and authorization, NSSAA, status comprising a plurality of records for the wireless terminal.

Various embodiments may preferably implement the following features:

Preferably, one of the plurality of records comprises at least one of S-NSSAI or an authentication status of the S-NSSAI.

Preferably, the wireless communication method further comprises transmitting, to the NSSAAF, an indication of storing the NSSAA status.

Preferably, the wireless communication method further comprises transmitting, to the NSSAAF, a request for retrieving the NSSAA status.

Preferably, the AMF does not have the NSSAA status of the wireless terminal.

Preferably, the wireless communication method further comprises transmitting, to a unified data management, UDM, a registration request for the wireless terminal.

Preferably, the wireless communication method further comprises transmitting, to a network repository function, a unified resource identifier of the AMF for receiving the NSSAA status.

Preferably, at least one authentication status corresponding to the list of requested S-NSSAI is valid or indicates a success, and the wireless communication method further comprises skipping an NSSAA procedure.

Preferably, the NSSAA status does not comprise at least one requested S-NSSAI or at least one authentication status corresponding to the list of requested S-NSSAI expires or indicates a failure, and the wireless communication method further comprises triggering an NSSAA procedure.

The present disclosure relates to a wireless communication method for use in a unified data management. The wireless communication method comprises:

receiving, from a network slice-specific authentication and authorization function, NSSAAF, a subscription of a registration event associated with a wireless terminal, receiving, from an access and mobility management function, AMF, a registration request for the wireless terminal, and transmitting, to the NSSAAF, a registration event notification based on the subscription.

Various embodiments may preferably implement the following feature:

Preferably, the registration event notification comprises at least one of an instance identification of the AMF, an action type indicating one of a registration or a deregistration, a uniform resource identifier for receiving the NSSAA status, or an identifier of the wireless terminal.

The present disclosure relates to a wireless device, comprising:

a processor, configured to store a network slice-specific authentication and authorization, NSSAA, status comprising a plurality of records for a wireless terminal, and a communication unit configured to transmit, to an access and mobility management function, AMF, the NSSAA status.

Various embodiments may preferably implement the following feature:

Preferably, the processor is configured to perform a wireless communication method of any of the foregoing described methods.

The present disclosure relates to a wireless device, comprising a communication unit configured to:

receive, from a wireless terminal, a registration request comprising a list of requested single network slice selection assistance information, S-NSSAI, and receive, from a network slice-specific authentication and authorization function, NSSAAF, a network slice-specific authentication and authorization, NSSAA, status comprising a plurality of records for the wireless terminal.

Various embodiments may preferably implement the following feature:

Preferably, the wireless device further comprises a processor configured to perform a wireless communication method of any of the foregoing described methods.

The present disclosure relates to a wireless device, comprising a communication unit configured to:

receive, from a network slice-specific authentication and authorization function, NSSAAF, a subscription of a registration event associated with a wireless terminal, receive, from an access and mobility management function, AMF, a registration request for the wireless terminal, and transmit, to the NSSAAF, a registration event notification based on the subscription.

Various embodiments may preferably implement the following feature:

Preferably, the wireless device further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION OF THE DRAWINGS AND THE PRESENTLY PREFERRED EMBODIMENTS

Figure 1:
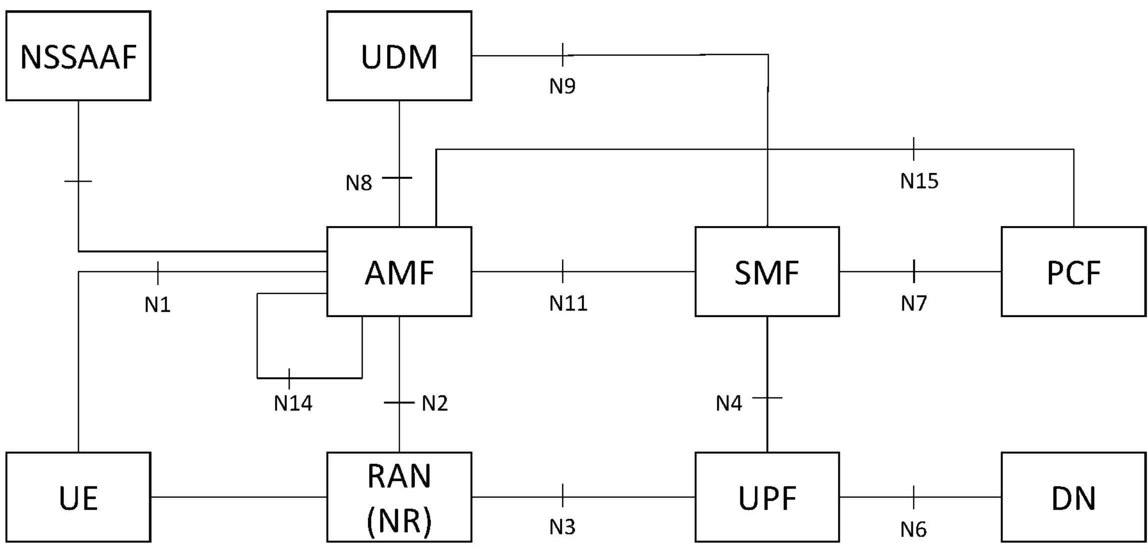
FIG. 1 shows a schematic diagram of a communication system according to an embodiment of the present disclosure.

FIG. 1 shows a schematic diagram of a communication system according to an embodiment of the present disclosure.

In FIG. 1, there are the following network functions:

1) UE: User Equipment.

2): RAN: Radio Access Network (node).

In the 5G communication system, 5G, the RAN may be an NR base station (e.g. gNodeB (gNB)).

3) AMF: Access and Mobility Management function

The AMF includes the following functionalities: a registration management, a connection management, a reachability management and a mobility management. The AMF also performs an access authentication and an access authorization. In addition, the AMF is a non-access-stratum (NAS) security termination and relays a session management (SM) NAS between the UE and a session management function (SMF), etc.

4) SMF: Session Management Function

The SMF includes the following functionalities: a session establishment, a modification and release, a UE internet protocol (IP) address allocation & management (including optional authorization functions), a selection and control of user plane (UP) function (UPF), a downlink data notification, etc. The SMF controls the UPF via an N4 association.

5) UPF: User plane function

The UPF includes the following functionalities: serving as an anchor point for intra-/inter-radio access technology (RAT) mobility, packet routing & forwarding, traffic usage reporting, QoS handling for the user plane, downlink packet buffering and downlink data notification triggering, etc. the UPF may be deployed as an intermediate UPF (I-UPF) or a packet data unit (PDU) session anchor (PSA). The PSA/UPF is the UPF terminating an N6 interface towards a data network (DN). The I-UPF provides traffics forwarding between the RAN and the PSA/UPF. The I-UPF may support "ULCL" (Uplink classifier: offloading uplink traffic based on target IP address) or "BP" (Branching point: offloading uplink traffic based on source IP address) to offload some traffics to a local PSA/UPF.

6) PCF: Policy Control Function

The PCF provides quality-of-service (QoS) policy rules to control plane (CP) functions to enforce the QoS policy rules. The PCF(s) transform(s) requests from an application function (AF) into policies that apply to PDU sessions. The PCF provides the AF influenced traffic steering enforcement control in policy and charging control (PCC) rules to the SMF, so the SMF can establish a data path of offloading the traffic to the local DN.

7) AF: Application Function

The AF interacts with 3GPP core network in order to provide services, e.g., to support application influence on traffic routing. Based on operator's deployment, AFs considered to be trusted by the operator can be allowed to interact directly with relevant network functions and the AFs not allowed by the operator to access directly the network functions shall use an external exposure framework via a network exposure function (NEF) to interact with relevant network functions.

8) NSSAAF: Network Slice-Specific Authentication and Authorization Function

The NSSAAF provides services to verify whether the UE is allowed to use a service provided by a specific network slice.

9) UDM: Unified Data Management

The UDM stores long-term security credentials used in authentication. In addition, the UDM stores subscription information.

Figure 2:
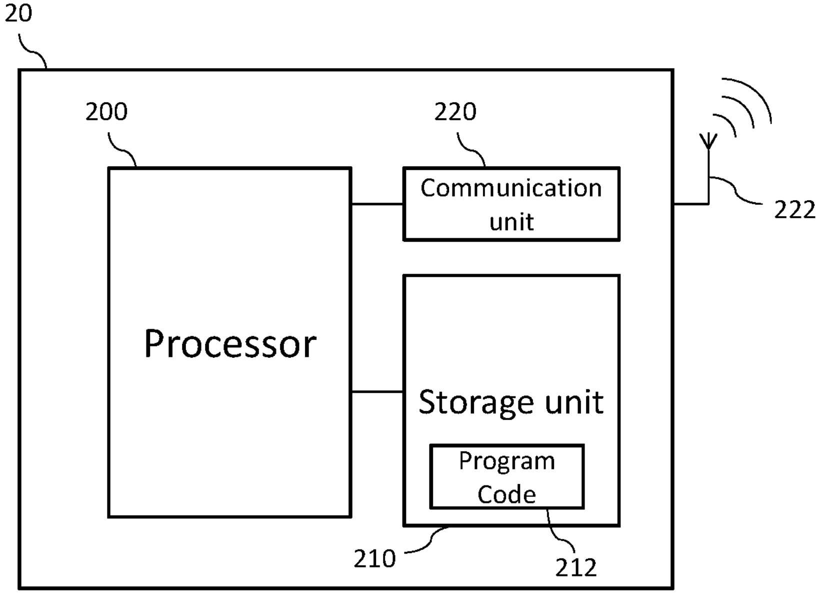
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
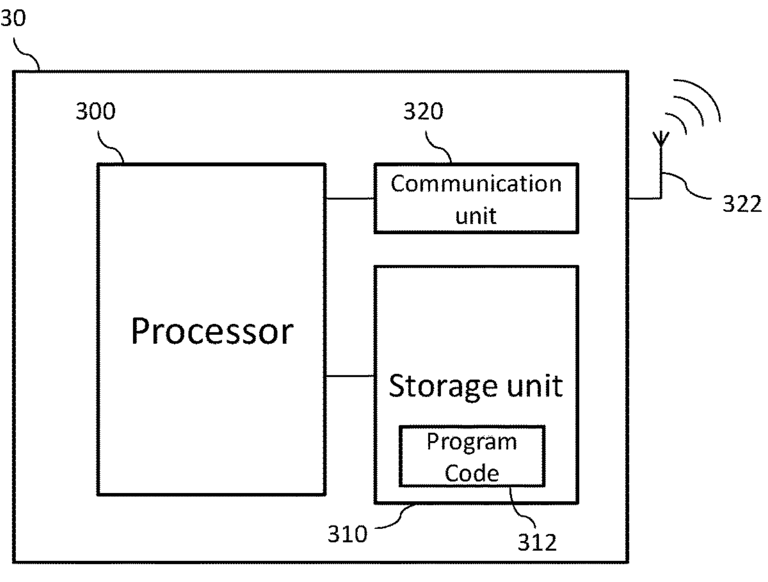
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (perform) at least one network function such as an access and mobility management function (AMF), a session management function (SMF), a user place function (UPF), a policy control function (PCF), an application function (AF), a network slice-specific authentication and authorization function (NSSAAF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

In the present disclosure, an identification may be equal to an identifier.

According to an embodiment, in order to verify whether the UE can access a list of network slice(s) to get corresponding services, the AMF triggers an NSSAA procedure by invoking the service provided by the NSSAAF.

Figure 4:
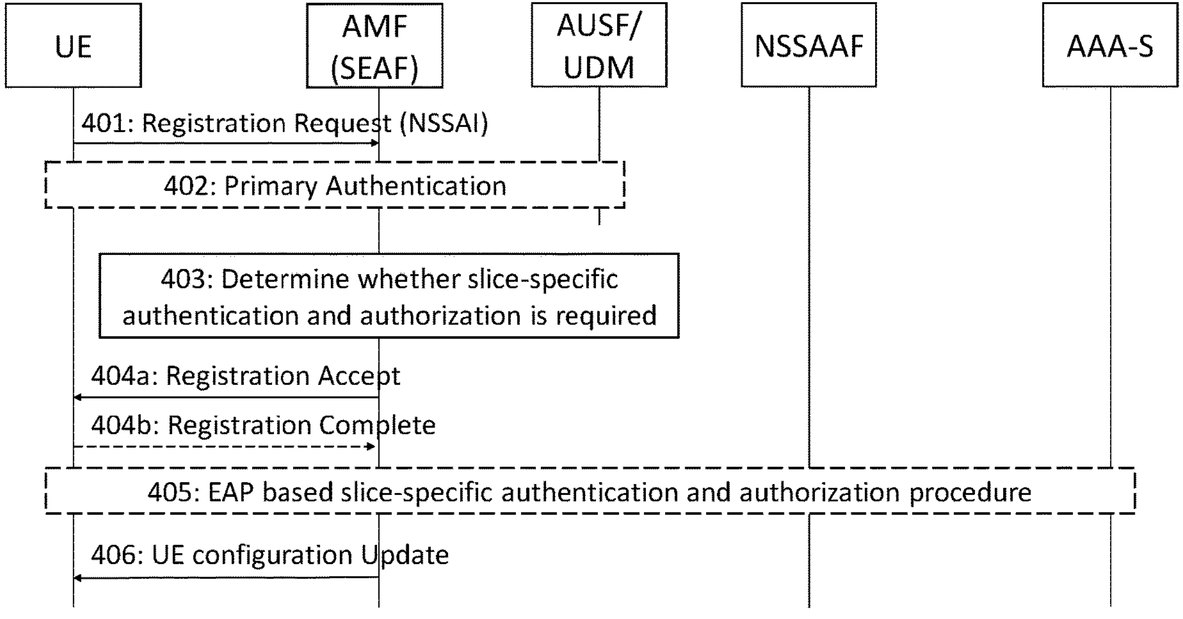
FIG. 4 shows schematic diagram of a procedure according to an embodiment of the present disclosure.

FIG. 4 shows schematic diagram of a procedure of the AMF triggering the NSSAA procedure according to an embodiment of the present disclosure. In FIG. 4, the UE, the AMF, the UDM and the NSSAAF may be those shown in FIG. 1. In addition, authentication, authorization and accounting server (AAA-S) is also shown in FIG. 4. Note that an authentication server function (AUSF) may be deployed with the UDM in this embodiment. In the procedure shown in FIG. 4, the UE requests accessing to the (5G) network and initiates a registration procedure towards the AMF.

More specifically, the UE sends a registration request with a list of S-NSSAIs. In an embodiment, the UE may not include those S-NSSAIs for which NSSAA is ongoing, regardless of the access type (e.g. 3GPP access and Non-3GPP access) (step 401).

In step 402, for an initial registration request, the AMF may invoke a primary authentication. In an embodiment, for a subsequent registration request, the primary authentication may be skipped if the UE has already been authenticated and the AMF has valid security context.

In step 403, the AMF determines whether a slice-specific authentication and authorization is required for each of S-NSSAIs, based on information stored locally or retrieved from the UDM. For example, the network slice-specific authentication for an S-NSSAI may be omitted when at least one of the following conditions meet:

1) if the slice-specific authentication and authorization is not required based on the subscription information from the UDM,
2) if the UE has previously performed the network slice-specific authentication successfully, regardless of the access type and/or corresponding result is still valid, or
3) network slice-specific authentication for the UE is ongoing.

In steps 404*a* and 404*b*, the AMF sends the UE a registration accept message and optionally the UE sends a registration complete message.

In step 405, an extensible authentication protocol (EAP) based slice-specific authentication and authorization procedure for each S-NSSAI is performed, if needed, based on determination results in step 403.

In step 406, based on the results of the EAP based slice-specific authentication and authorization procedure in step 405, if any, the AMF sends a UE configuration update to update the requested S-NSSAI status (e.g. corresponding to the S-NSSAI(s) in the list of S-NSSAI transmitted in step 401) based on slice-specific authentication results.

Figures 5A, 5B:
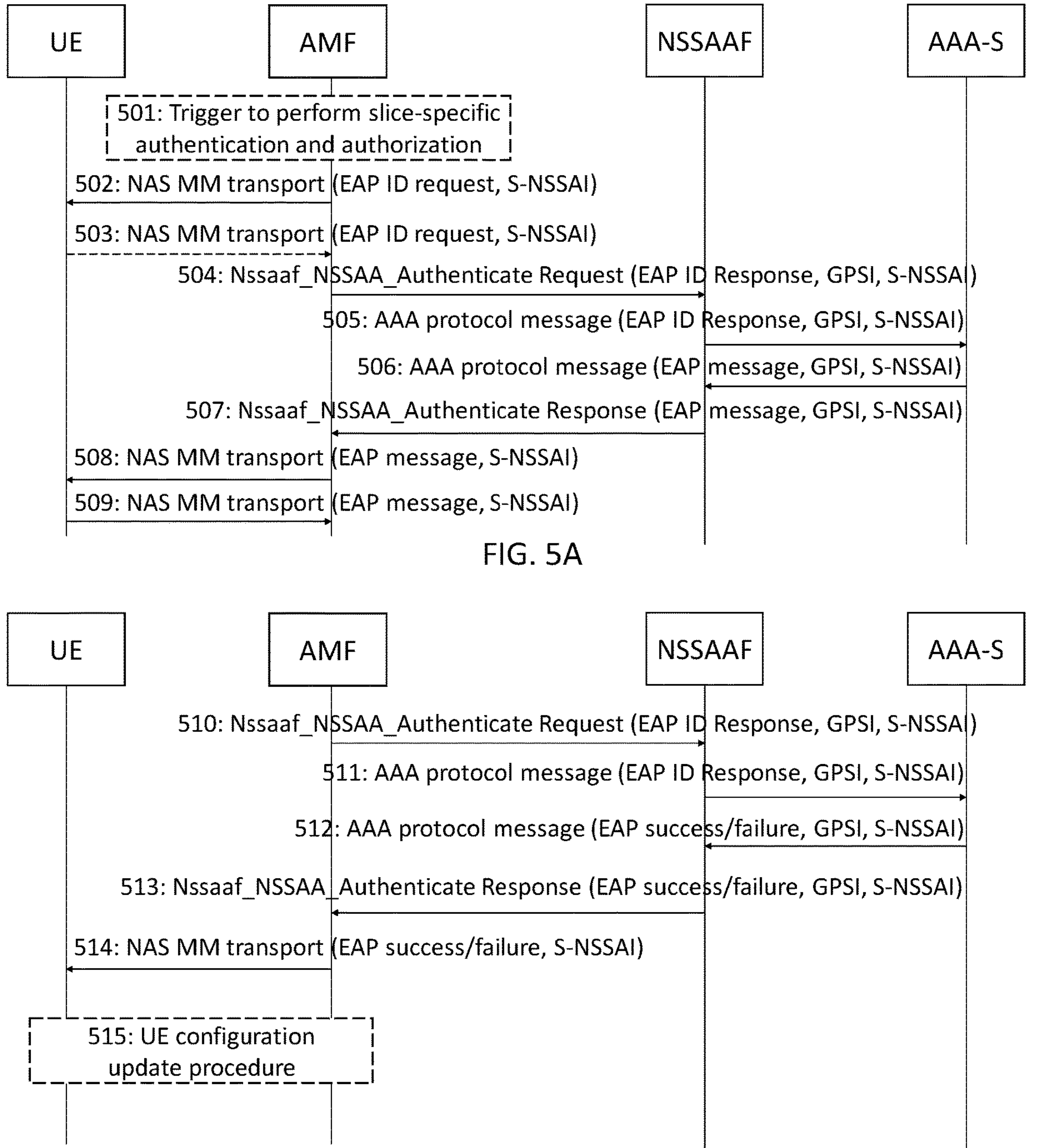
FIGS. 5A and 5B show schematic diagrams of a procedure according to an embodiment of the present disclosure.

FIGS. 5A and 5B show a schematic diagram of the NSSAA procedure according to an embodiment of the present disclosure. In FIGS. 5A and 5B, the UE, the AMF and the NSSAAF may be those shown in FIG. 1. In addition, AAA-S is also shown in FIGS. 5A and 5B. In FIGS. 5A and 5B, interactions among the UE, the AMF, the NSSAAF and the AAA-S are described.

More specifically, for the S-NSSAIs that are requiring the network slice-specific authentication and authorization, the AMF may trigger the network slice specific authentication and authorization based on changes of subscription information, or triggered by the AAA-S (step 501).

In case the network slice specific authentication and authorization procedure is triggered as a result of a registration procedure, the AMF may determine, based on UE context in the AMF, that for some or all S-NSSAI(s) subject to the network slice specific authentication and authorization, the UE has already been authenticated following the registration procedure on a first access. Depending on the network slice specific authentication and authorization result (e.g. success/failure) from a previous registration, the AMF may decide, based on network policies, to skip the network slice specific authentication and authorization for these S-NSSAIs during the registration (procedure) on the second access.

If the network slice specific authentication and authorization procedure corresponds to a re-authentication and re-authorization procedure triggered as a result of AAA-S-triggered UE re-authentication and re-authorization for one or more S-NSSAIs, or triggered by the AMF based on operator policy or a subscription change and if the S-NSSAIs that require the network slice-specific authentication and authorization are included in the allowed S-NSSAI for each access type, the AMF selects an access type to be used to perform the network slice specific authentication and authorization procedure based on the network policies.

In step 502, the AMF may request from the UE a user identification (ID) for an EAP authentication (i.e. EAP ID) for the S-NSSAI in an NAS MM Transport message including the S-NSSAI.

In step 503, the UE provides the EAP ID for the S-NSSAI alongside the S-NSSAI in an NAS MM transport message towards the AMF.

In step 504, the AMF sends the EAP ID to the NSSAAF, which provides an interface with the AAA-S, in an Nssaaf_NSSAA_Authenticate request (e.g. comprising EAP ID response, generic public subscription identifier (GPSI) and/or the S-NSSAI).

In step 505, if an AAA-proxy (AAA-P) is present (e.g. because the AAA-S belongs to a third party and the operator deploys a proxy towards third parties), the NSSAAF forwards the EAP ID response message to the AAA-P, otherwise the NSSAAF forwards the message directly to the AAA-S. The NSSAAF routes to the AAA-S based on the S-NSSAI. The NSSAAF/AAA-P forwards the EAP identity message to the AAA-S together with the S-NSSAI and the GPSI. The AAA-S stores the GPSI to create an association with the EAP ID in the EAP ID response message so the AAA-S can later use it to revoke an authorization or to trigger a reauthentication. The AAA-S uses the EAP-ID and the S-NSSAI to identify for which UE and slice authorization is requested.

In steps 506 to 509 (FIG. 5A) and 8 to 11 (FIG. 5B), EAP-messages are exchanged with the UE. Note that one or more than one iteration of these steps may occur.

In step 512, the EAP authentication completes and an EAP-Success/Failure message is delivered to the NSSAAF/AAA-P along with the GPSI and the S-NSSAI.

In step 513, the NSSAAF sends an Nssaaf_NSSAA_Authenticate response (e.g. comprising the EAP-success/failure, the S-NSSAI, the GPSI) to the AMF.

In step 514, the AMF transmits an NAS MM transport message (e.g. comprising EAP-success/failure) to the UE.

In step 515, based on the result of the slice specific authentication (EAP-success/failure), if a new allowed NSSAI or new rejected NSSAIs need to be delivered to the UE, or if the AMF re-allocation is required, the AMF initiates a UE configuration update procedure, for each access type.

If an S-NSSAI is successfully verified by the NSSAA procedure, the AMF sets the NSSAA status of corresponding S-NSSAI to EAP-Success, otherwise set to the NSSAA status of the corresponding S-NSSAI to EAP-Failure. The AMF stores the NSSAA status of each S-NSSAI in the UE context, and the UE is also updated with the allowed NSSAI(s). Later on, if the UE requests a registration update, the AMF will not trigger the NSSAA procedure to those S-NSSAI(s) which status are set to the EAP-Success.

In an embodiment, the information of whether an S-NSSAI is successfully authenticated may be stored in the NSSAAF. In addition, a list of S-NSSAI (e.g. S-NSSAIs) and its corresponding NSSAA authentication status may be grouped to an NSSAA status. In this embodiment, such NSSAA status may be provided to the AMF when needed, so as to avoid unnecessary NSSAA procedures in subsequent procedures, e.g. a registration procedure or a handover procedure. Thus, the AMF is able to use the retrieved NSSAA status to determine whether the NSSAA procedure for indicated S-NSSAI is needed or not.

Embodiment 1—NSSAA Status Pull Mode

In an embodiment, the NSSAAF stores or updates the NSSAA status after successfully performing the NSSAA procedure, and the AMF pulls (e.g. accesses or retrieves) the NSSAA status from the NSSAAF.

Figures 6A, 6B:
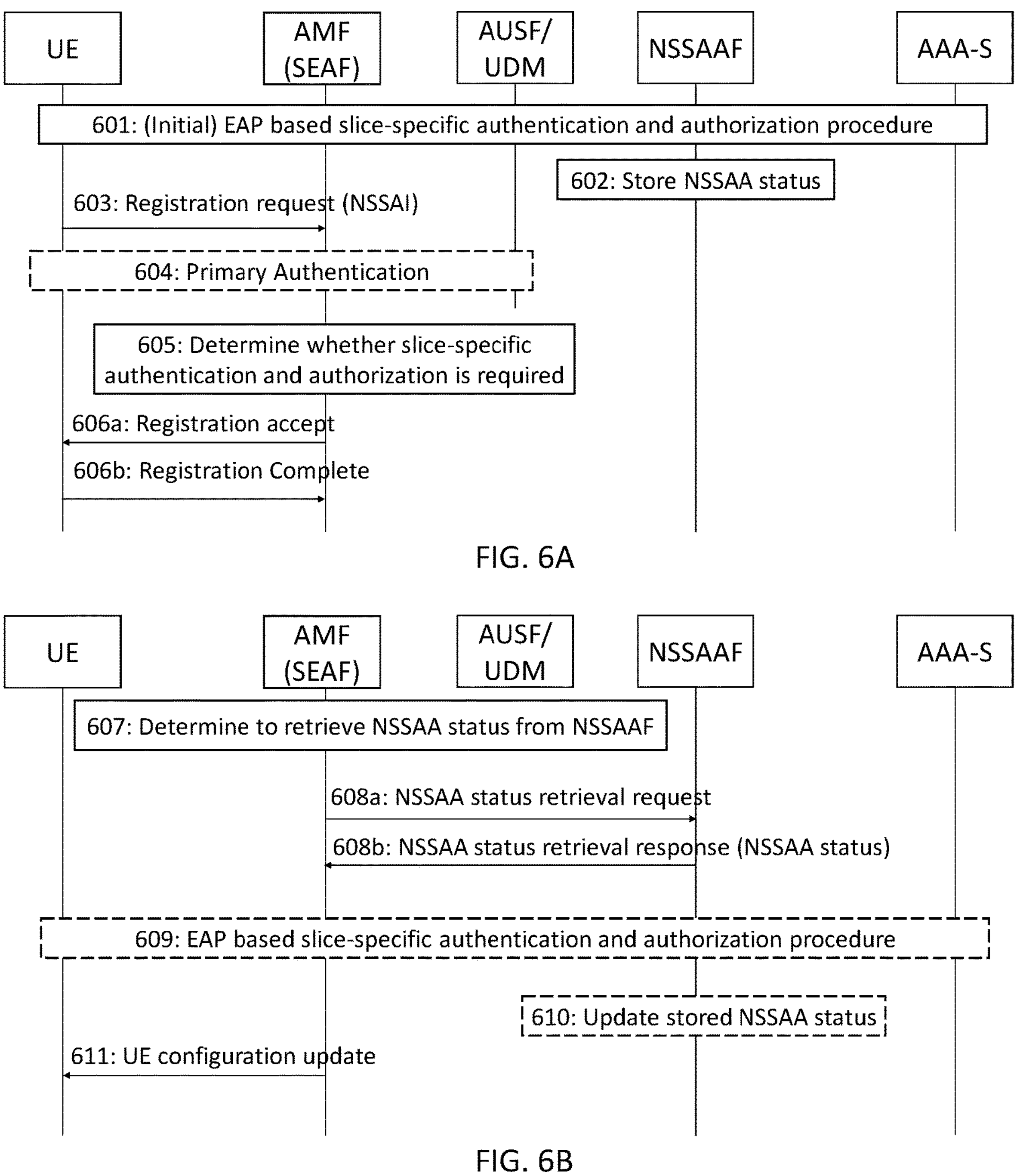
FIGS. 6A and 6B show schematic diagrams of a procedure according to an embodiment of the present disclosure.

FIGS. 6A and 6B shows schematic diagrams of a procedure that the AMF pulls NSSAA status from the NSSAAF according to an embodiment of the present disclosure. In FIGS. 6A and 6B, the UE, the AMF, the UDM and the NSSAAF may be those shown in FIG. 1. In addition, an AAA-S is also shown in FIGS. 6A and 6B. Note that the AUSF may be deployed with the UDM. In this embodiment, it assumes that the UE previously moves from the 5G network to the 4G network and now moves back to the 5G network. That is, the NSSAA procedure is originally expected, as there is no NSSAA status stored in the AMF.

In addition, in order to avoid the unnecessary NSSAA procedure, the NSSAAF stores the result of NSSAA procedure for S-NSSAI(s) and the AMF retrieves the stored NSSAA status from the NSSAAF in this embodiment.

Specifically, similar to the procedure shown in FIGS. 4 and 5, an NSSAA procedure is triggered (step 601). In an embodiment, based on the local policy or UE characteristics (e.g. UE may move between the 4G network and 5G network frequently), the AMF may request the NSSAAF to store the NSSAA status after the NSSAA procedure successfully performed. For example, when sending an Nnssaaf_NSSAA_Authenticate request to the NSSAAF, the AMF includes a "Store NSSAA Status" indication which is used to instruct the NSSAAF to store the NSSAA status after the NSSAA procedure.

In step 602, after the NSSAA procedure successfully performed, the NSSAAF stores the NSSAA status in its local storage or in a shared storage.

In an embodiment, the NSSAAF may determine to store the NSSAA status after NSSAA procedure, based on one of the following instructions: the instruction from local configuration to store the NSSAA status (e.g. configured by an operator); or, the "Store NSSAA Status" indication from the AMF during the NSSAA procedure.

In an embodiment, the NSSAA status consists of a list of records (e.g. comprising S-NSSAI(s) and/or EAP authentication status(es)) for a given UE. In an embodiment, each record indicates (e.g. comprises) an EAP-based authentication status for a given S-NSSAI. In an embodiment, the EAP authentication status indicates one of an EAP-Success or an EAP-Failure.

In an embodiment, the NSSAA status stored by the NSSAAF may be associated with an expiry time. When the time expires, the stored NSSAA status should be regarded useless.

Steps 603 to 606*b* are similar to steps 401 to 404*b*, when the UE moves back to the 5G network from the 4G network, a registration update procedure is performed.

In step 607 (shown in FIG. 6B), the AMF determines to retrieve the NSSAA status from the NSSAAF before the AMF initiates an NSSAA procedure for any S-NSSAI.

In steps 608*a* and 608*b*, the AMF sends an NSSAA status retrieval request to the NSSAAF and acquires the NSSAA status from the NSSAA status retrieval response sent from the NSSAAF.

In an embodiment, within the NSSAA status retrieval request, the AMF indicates an identifier of the given UE (e.g. GPSI) for whom the NSSAA status is required.

In an embodiment, the NSSAA status returned by the NSSAAF includes a list of binary records (e.g. comprising the S-NSSAI and/or the EAP authentication status). In an embodiment, the EAP authentication status indicates the result of the NSSAA procedure for the corresponding S-NSSAI.

In step 609, if there are S-NSSAI(s) not included in the returned NSSAA Status while required for NSSAA procedure, the AMF triggers the NSSAA procedure described in FIG. 5 for this (these) S-NSSAI(s).

In step 610, if step 609 is performed, the NSSAAF further updates the stored NSSAA status according to the result of the NSSAA procedure performed in step 609.

In step 611, based on the results of step 609, the AMF sends the UE a configuration update to update the requested S-NSSAI status.

Embodiment 2—NSSAA Status Push Mode

In an embodiment, the NSSAAF stores or updates the NSSAA status after successfully performing an NSSAA procedure. Meanwhile, the NSSAAF subscribes an AMF Registration event from the UDM for the given UE. When it receives a notification of a new AMF registration, the NSSAAF pushes (e.g. transmits) the NSSAA status to the AMF.

Figures 7A, 7B:
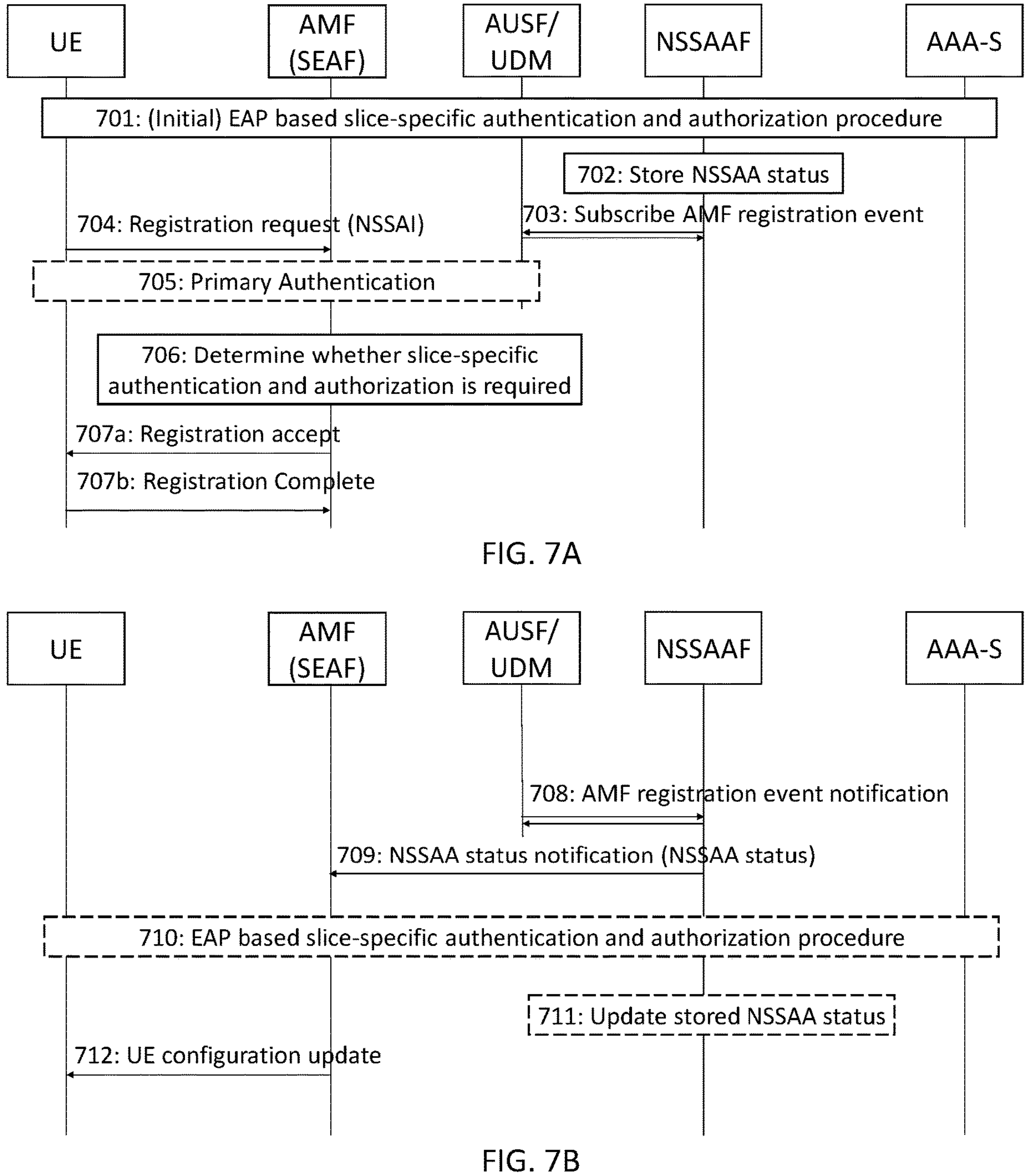
FIGS. 7A and 7B show schematic diagrams of a procedure according to an embodiment of the present disclosure.

FIGS. 7A and 7B shows schematic diagrams of a procedure the NSSAAF pushes the NSSAA status to the AMF according to an embodiment of the present disclosure. In FIGS. 7A and 7B, the UE, the AMF, the UDM and the NSSAAF may be those shown in FIG. 1. In addition, an AAA-S is also shown in FIGS. 7A and 7B. Note that the AUSF may be deployed with the UDM in this embodiment.

In the procedure shown in FIGS. 7A and 7B, it is assumed that the UE previously moves from the 5G network to the 4G network and moves back to the 5G network. Thus, the NSSAA procedure is originally expected, as there is no NSSAA status stored in the AMF.

In order to avoid the unnecessary NSSAA procedure, in this embodiment, the NSSAAF stores the result(s) of NSSAA procedure(s) for those S-NSSAI(s) and provides the stored NSSAA status to the AMF.

More specifically, an NSSAA procedure is triggered in step 701.

In an embodiment, the AMF may request the NSSAAF to store the NSSAA status after (or during) the NSSAA procedure in step 701.

In step 702, after the NSSAA procedure is successfully performed, the NSSAAF stores the NSSAA status in its local storage or in a shared storage.

In an embodiment, the NSSAAF may determine to store the NSSAA status based on the instructions addressed in step 602 of FIG. 6A.

In step 703, the NSSAAF subscribes an AMF registration event to the UDM, for the given UE. For example, the NSSAAF sends an AMF registration event subscription request to the UDM.

Later, if the UDM receives an AMF registration and/or an AMF deregistration message (e.g. associated with the given UE) from an AMF, the UDM sends an AMF registration event notification to the NSSAAF. Thus, the NSSAF acknowledges that the UE is registered to a new AMF or deregistered from the previous AMF.

In steps 604 to 607*b*, as the UE moves back to the 5G network from the 4G network, a registration update procedure is performed.

In an embodiment, once the AMF accepts the registration request from the UE, the AMF sends an AMF registration to the UDM. In addition, when the AMF sends the AMF registration to the UDM, the AMF may include an AMF callback uniform resource identifier (URI) for (e.g. receiving) NSSAA Status notification in the AMF registration request message. The UDM stores the AMF callback URI for NSSAA Status notification in the AMF registration context.

In step 708, the UDM sends an AMF registration event notification to the NSSAAF.

In an embodiment, the AMF registration event notification includes at least one of:

the AMF Instance ID, a registration or deregistration action, an identifier of UE (e.g. UE ID) or optionally, the AMF callback URI for NSSAA Status notification (e.g. named as nssaaStatusCallbackUri).

In this embodiment, the NSSAAF acquires the AMF callback URI for NSSAA Status notification and thus can use this callback URI to send the NSSAA status to the AMF.

In an embodiment, if there is no AMF callback URI for NSSAA Status notification (in the AMF registration event notification), the NSSAAF may query a network repository function (NRF) to get NF Profile of this AMF and to get corresponding callback URI. In this embodiment, the AMF registers its callback URI for NSSAA Status notification in its NF Profile to the NRF.

In step 709, the NSSAAF sends the NSSAA Status notification to the AMF.

In an embodiment, the NSSAA Status notification includes the following information:

an identifier of a given UE, a list of binary records (e.g. comprising the S-NSSAI(s) and EAP authentication status(s)). In an embodiment, the EAP authentication status indicates the result of the NSSAA procedure for the corresponding S-NSSAI.

In step 710, if there are S-NSSAI(s) not included in the returned NSSAA status while required for NSSAA procedure, the AMF triggers the NSSAA procedure described in FIG. 5 for this (these) S-NSSAI(s).

In step 711, if step 710 is performed, the NSSAAF further updates the stored NSSAA status according to the result of the NSSAA procedure performed in step 710.

In step 712, based on the results of step 710, the AMF sends the UE a configuration update to update the requested S-NSSAI status.

Figure 8:
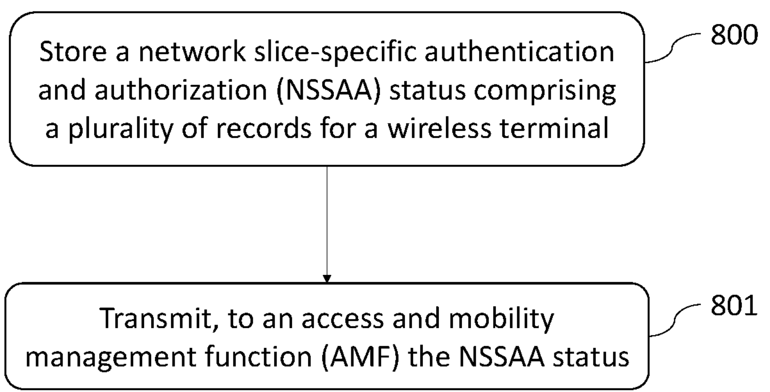
FIG. 8 shows a flowchart of a process according to an embodiment of the present disclosure.

FIG. 8 shows a flowchart of a process according to an embodiment of the present disclosure. The process shown in FIG. 8 may be use in a wireless device comprising (e.g. performing, providing the service of) the NSSAAF and comprises the following steps:

Step 800: Store a network slice-specific authentication and authorization (NSSAA) status comprising a plurality of records for a wireless terminal.

Step 801: Transmit, to an access and mobility management function (AMF) the NSSAA status.

In the process shown in FIG. 8, the wireless device (i.e. the NSSAAF) stores a NSSAA status comprising a plurality of records for a wireless terminal (e.g. UE). Next, the wireless device may transmit the NSSAA status to an AMF (e.g. a wireless network performing or providing the service of the AMF).

In an embodiment, one of the plurality of records comprises at least one of S-NSSAI, or an authentication status of the S-NSSAI.

In an embodiment, the wireless device receives an indication of storing the NSSAA status from the AMF.

In an embodiment, the wireless device receives a request for retrieving the NSSAA status from the AMF.

In an embodiment, the wireless device subscribes, to a UDM, a registration event associated with the wireless terminal.

In an embodiment, the wireless device receives, from the UDM, a registration event notification corresponding to the registration event associated with the wireless terminal, e.g., when the registration event associated with the wireless terminal occurs.

In an embodiment, the registration event is associated with at least one of a registration or a deregistration of an AMF for the wireless terminal.

In an embodiment, the registration event notification comprises at least one of an instance identification of the AMF, an action type indicating one of a registration or a deregistration, a uniform resource identifier for transmitting the NSSAA status or an identifier of the wireless terminal.

In an embodiment, the wireless device transmits, to an NRF, a request for a unified resource identifier of the AMF for communicating (e.g. transmitting) the NSSAA status.

In an embodiment, the NSSAA status further comprises an identifier of the wireless terminal (e.g. UE ID).

In an embodiment, the wireless device updates the NSSAA status according to a result of an NSSAA procedure.

Figure 9:
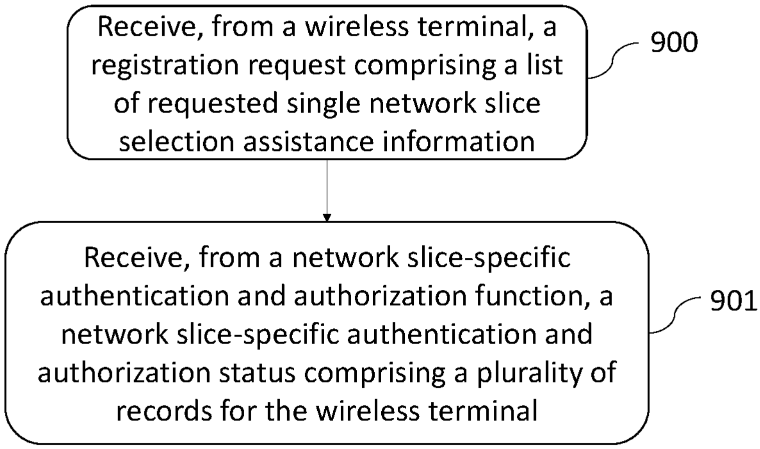
FIG. 9 shows a flowchart of a process according to an embodiment of the present disclosure.

FIG. 9 shows a flowchart of a process according to an embodiment of the present disclosure. The process shown in FIG. 9 may be used in a wireless device comprising (e.g. performing, or providing the service of) an AMF and comprises the following steps:

Step 900: Receive, from a wireless terminal, a registration request comprising a list of requested single network slice selection assistance information.

Step 901: Receive, from a network slice-specific authentication and authorization function, a network slice-specific authentication and authorization status comprising a plurality of records for the wireless terminal.

In the process shown in FIG. 9, the wireless device (i.e. the AMF) receives a registration request comprising a list of requested S-NSSAI from a wireless terminal (e.g. UE). Note that, the list of request S-NSSAI may comprises at least one S-NSSAI. Next, the wireless device receives, from an NSSAAF, an NSSAA status comprising a plurality of records for the wireless terminal. Based on the NSSAA status, the additional NSSAA procedure may be avoided.

In an embodiment, one of the plurality of records comprises at least one of S-NSSAI or an authentication status of the S-NSSAI.

In an embodiment, the wireless device transmits an indication of storing the NSSAA status to the NSSAAF.

In an embodiment, the wireless device transmits a request for retrieving the NSSAA status to the NSSAAF.

In an embodiment, the wireless device does not have the NSSAA status of the wireless terminal.

In an embodiment, the wireless device transmits, to an NRF, a URI of the wireless device (i.e. AMF) for communicating (e.g. receiving) the NSSAA status.

In an embodiment, at least one authentication status corresponding to the list of requested S-NSSAI is valid or indicates a success. In such a case, the wireless device may skip an NSSAA procedure.

In an embodiment, the NSSAA status does not comprise at least one requested S-NSSAI (e.g. in the list of requested S-NSSAI) or at least one authentication status corresponding to the list of requested S-NSSAI expires or indicates a failure. In this embodiment, the wireless device may trigger an NSSAA procedure.

Figure 10:
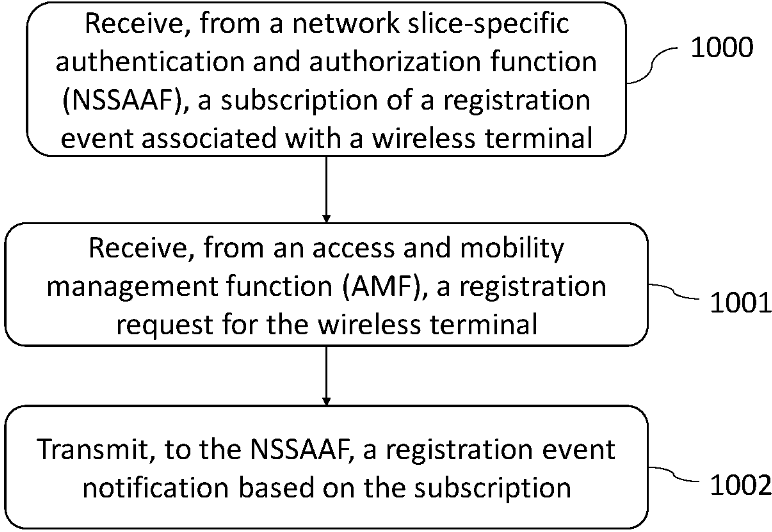
FIG. 10 shows a flowchart of a process according to an embodiment of the present disclosure.

FIG. 10 shows a flowchart of a process according to an embodiment of the present disclosure. The process shown in FIG. 10 may be used in a wireless device comprising (e.g. performing, or providing the service of) a UDM and comprises the following steps:

Step 1000: Receive, from a network slice-specific authentication and authorization function (NSSAAF), a subscription of a registration event associated with a wireless terminal.

Step 1001: Receive, from an access and mobility management function (AMF), a registration request for the wireless terminal.

Step 1002: Transmit, to the NSSAAF, a registration event notification based on the subscription.

In the process shown in FIG. 10, the wireless device (i.e. the UDM) receives, from an NSSAAF, a subscription of a registration event associated with a wireless terminal. Next, the wireless device receives, from an AMF, a registration request for the wireless terminal. Based on the subscription received in step 1000, the wireless device transmits, to the NSSAAF, a registration event notification.

In an embodiment, the registration event notification comprises at least one of an instance identification of the AMF, an action type indicating one of a registration or a deregistration, a uniform resource identifier for communicating (e.g. receiving) the NSSAA status, or an identifier of the wireless terminal.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in network slice-specific authentication and authorization function (NSSAAF), the wireless communication method comprising:

storing, by the NSSAAF, a network slice-specific authentication and authorization (NSSAA) status comprising a plurality of records for a wireless terminal, receiving, by the NSSAAF from an access and mobility management function (AMF), a request for retrieving the NSSAA status, and transmitting, by the NSSAAF to the AMF, the stored NSSAA status, wherein the AMF requests the NSSAAF to store the NSSAA status after or during an NSSAA procedure, the method further comprising:

subscribing, by the NSSAAF to a registration event for the wireless terminal at a unified data management (UDM); and transmitting the NSSAA status from the NSSAAF to the AMF upon receiving a registration event notification from the UDM, wherein the registration event notification comprises an action type indicating one of a registration or a deregistration of the wireless terminal with the AMF.

2. The wireless communication method of claim 1, wherein one of the plurality of records comprises at least one of single network slice selection assistance information (S-NSSAI), or an authentication status of the S-NSSAI.

3. The wireless communication method of claim 1, further comprising:

receiving, from the AMF, an indication of storing the NSSAA status.

4. The wireless communication method of claim 1, wherein the registration event is associated with at least one of a registration or a deregistration of an AMF for the wireless terminal.

5. The wireless communication method of claim 1, wherein the registration event notification comprises at least one of an instance identification of the AMF, a uniform resource identifier for transmitting the NSSAA status or an identifier of the wireless terminal.

6. The wireless communication method of claim 1, further comprising:

transmitting, to a network repository function, a request for a unified resource identifier of the AMF for transmitting the NSSAA status.

7. The wireless communication method of claim 1, wherein the NSSAA status further comprises an identifier of the wireless terminal.

8. The wireless communication method of claim 1, further comprising:

updating the NSSAA status according to a result of the NSSAA procedure.

9. A network slice-specific authentication and authorization function (NSSAAF), comprising:

a processor, configured to:

store a network slice-specific authentication and authorization (NSSAA) status comprising a plurality of records for a wireless terminal, receive, from an access and mobility management function (AMF), a request for retrieving the NSSAA status, and a communication unit configured to transmit, to the AMF, the stored NSSAA status, wherein the AMF requests the NSSAAF to store the NSSAA status after or during an NSSAA procedure, the processor being further configured to:

subscribe to a registration event for the wireless terminal at a unified data management (UDM); and transmit the NSSAA status to the AMF upon receiving a registration event notification from the UDM, wherein the registration event notification comprises an action type indicating one of a registration or a deregistration of the wireless terminal with the AMF.

10. The NSSAAF of claim 9, wherein one of the plurality of records comprises at least one of single network slice selection assistance information (S-NSSAI), or an authentication status of the S-NSSAI.

11. A non-transitory computer-readable medium having code stored thereupon, the code, when executed by a processor, causing the processor to implement a wireless communication method recited in claim 1.

12. The NSSAAF of claim 9, further comprising:

receiving, from the AMF, an indication of storing the NSSAA status.

13. The NSSAAF of claim 9, wherein the processor is further configured to:

receive, from a unified data management (UDM), a registration event notification corresponding to the registration event associated with the wireless terminal, wherein the registration event is associated with at least one of a registration or a deregistration of an AMF for the wireless terminal.

14. The NSSAAF of claim 13, wherein the registration event notification comprises at least one of an instance identification of the AMF, a uniform resource identifier for transmitting the NSSAA status or an identifier of the wireless terminal.

15. The NSSAAF of claim 13, wherein the processor is further configured to:

transmit, to a network repository function, a request for a unified resource identifier of the AMF for transmitting the NSSAA status.

16. The NSSAAF of claim 13, wherein the NSSAA status further comprises an identifier of the wireless terminal.

17. The NSSAAF of claim 9, wherein the processor is further configured to:

update the NSSAA status according to a result of the NSSAA procedure.

* * * * *